UNITED STATES PATENT OFFICE.

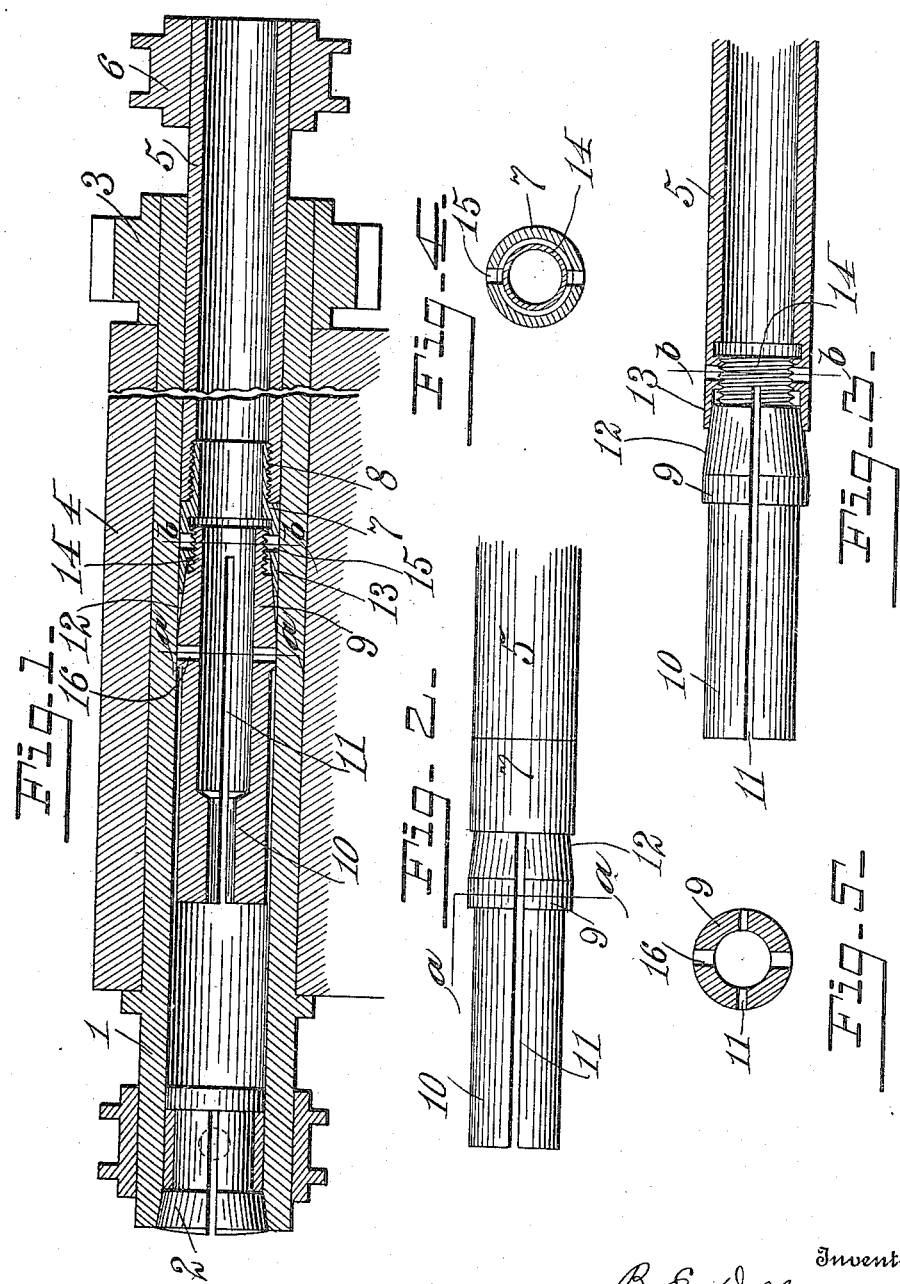

BURT E. DOHNER AND ALBERT J. HUFF, OF DAYTON, OHIO.

FEED-TUBE.

1,227,592. Specification of Letters Patent. Patented May 29, 1917.

Application filed February 15, 1916. Serial No. 78,415.

*To all whom it may concern:*

Be it known that we, BURT E. DOHNER and ALBERT J. HUFF, citizens of the United States, residing at Dayton, in the county of Montgomery and State of Ohio, have invented certain new and useful Improvements in Feed-Tubes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in feeding tools for automatic screw machines and comprises an adjustable feed tube having the new and useful features hereinafter more fully described. It has been the common experience heretofore to remove the stock grip member of the feed tube, when it became worn to such an extent that it would not properly grip the stock, to take it out and manipulate the metal to set the gripping jaws thereof to positions to firmly grip the stock. This operation required more or less time and was equally more or less annoying and it is, therefore the object of our invention to provide a feed tube with means for adjusting the same to compensate for the wear incidental to the work thereof.

Preceding a more detail description of the invention, reference is made to the accompanying drawings of which Figure 1 is a longitudinal section of the spindle of a screw machine showing our improved feed tube and other parts in their relative positions; Fig. 2 is a longitudinal elevation of the end of the feed tube with the stock-clamping member fixed therein; Fig. 3 is a similar elevation of a modified form of feed tube in which the adjusting member for the clamping end is shown integral with the tube; Fig. 4 is a cross-section on the line *b—b* of Figs. 1 and 3; Fig. 5 is a section on the line *a—a* of Figs. 1 and 2.

In a detail description of the invention, similar reference characters indicate corresponding parts.

Referring more particularly to the drawings, 1 designates a spindle, the same being mounted in a bearing or head 4 and having a drive gear 3 and a clutch or chuck 2, all of which are well known and common features of an automatic screw machine. 5 designates the feed tube which receives the stock to be fed and has a spool 6 on one end thereof through means of which it is reciprocated within the spindle 1 in a well known manner. Mounted in the end of said feed tube 5 is an adjusting head 7 attached thereto by means of screw-threads 8. This adjusting head 7 has an end opposite the screw-threads terminated in a socket or shell 13 the inner surface of which is tapered outwardly. This head 7 has a series of recesses 15 which are designed to receive a spanner-wrench by means of which it is manipulated. As shown in Fig. 3, the head 7 having the interior tapered surface is an integral part of the tube 5. 9 designates a clamping head which has an attachment with the first named head 7 by means of a screw-threaded end 14. This head 9 has an outer tapered surface 12 which is engaged by the tapered surface of the stock portion 13 of the first named head 7. The said head 9 is provided with a longitudinal slot 11 which in turn provides two clamping jaws 10—10 between which the stock is gripped in the feed tube. There are also provided in the clamping head 9 a series of recesses 16 for the engagement of a spanner-wrench by means of which the said clamping head 9 is adjusted while in position in the feed tube 5. It will be readily understood that by manipulating the said head 9 the tapered surface thereof, which is in engagement with the tapered surface 13 of the head 7, will have the effect of moving the jaws 10—10 inwardly to the desired extent for firmly gripping the stock passing through the feed tube. The clamping head 9, as shown in Fig. 3, is likewise adjusted to take up any wear of the engaging parts thereof in the same manner. Instead, however, of having the separate adjusting head 7, the tapered shell portion may be formed directly upon the end of the feed tube 5 and the clamping head 9 screwed directly into said end. The operation of the feed tube 5 is so well understood as to scarcely need any reference thereto. Briefly, however, it will be understood that the chuck or clutch member 2 holds the stock rigidly while the work is being performed thereon and the feed tube advances the work intermittently to said chuck. In the rearward travel of the feed tube, the stock is held firmly in the chuck 2 and each succeeding forward movement of said feed tube moves the stock carried therein in a position in the chuck 2 to be acted upon by the working tool of the machine.

As formerly stated, the necessary wear incidental to the clamping head 9 in time renders the same inefficient and it becomes necessary to remove the same from the machine to reset the clamping jaws or adjust them into proper position to firmly grip the stock. By means of our improvements this work is readily accomplished and facilitated without removing the clamping head 9 from the feed tube and thus having to perform work thereon to render it suitable for the work. The feed tube 5 is reciprocated in a well known manner as is also the chuck 2 and further description of the operation of these particular well known elements of the automatic screw machine is believed to be unnecessary.

Having described our invention, we claim:

1. In a machine of the character specified, the combination with a feed tube, of an adjusting head mounted in the end of said feed tube, and a clamping head for holding the stock mounted in said adjusting head.

2. In a machine of the character specified, the combination with a feed tube having a shell on the end thereof provided with an inner tapered surface and screw-threads adjacent thereto, of a clamping head for holding the stock adjustably connected with said shell, said clamping head having its outer surface tapered to engage the tapered surface of said shell whereby said clamping head may be adjusted relatively to its hold upon the stock.

3. In a machine of the character specified, the combination with a feed tube having an internally tapered socket portion on the end thereof, a clamping head adjustably inserted in said tapered socket portion and having a corresponding outwardly tapered surface engaged thereby, said clamping head being extended in clamping jaws between which the stock is held.

In testimony whereof we affix our signatures, in presence of two witnesses.

BURT E. DOHNER.
ALBERT J. HUFF.

Witnesses:
NELLIE GALLOWAY,
MATTHEW SEIBLER.

Copies of this patent may be obtained for five cents each, by addressing the "Commissioner of Patents, Washington, D. C."